(12) United States Patent
Lee et al.

(10) Patent No.: US 6,551,063 B1
(45) Date of Patent: Apr. 22, 2003

(54) FOIL FORMED STRUCTURE FOR TURBINE AIRFOIL TRAILING EDGE

(75) Inventors: Ching-Pang Lee, Cincinnati, OH (US); Melvin Robert Jackson, Niskayuna, NY (US); Stephen Joseph Ferrigno, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,250

(22) Filed: Dec. 20, 2001

(51) Int. Cl.[7] ................................. F01D 5/18
(52) U.S. Cl. ................ 416/97 R; 416/224; 416/229 A; 416/241 R
(58) Field of Search ................ 415/115, 116; 416/96 R, 96 A, 97 R, 229 A, 224, 241 R, 241 B

(56) References Cited

U.S. PATENT DOCUMENTS

| | | | |
|---|---|---|---|
| 3,423,069 A | * | 1/1969 | Chandley ............... 416/92 |
| 4,064,300 A | | 12/1977 | Bhangu |
| 4,142,824 A | | 3/1979 | Andersen |
| 4,303,374 A | * | 12/1981 | Braddy ............... 416/97 R |
| 5,295,530 A | | 3/1994 | O'Connor et al. |
| 5,348,446 A | * | 9/1994 | Lee et al. ............... 416/241 R |
| 5,368,441 A | | 11/1994 | Sylvestro et al. |
| 5,427,866 A | | 6/1995 | Nagaraj et al. |
| 5,626,462 A | | 5/1997 | Jackson et al. |
| 6,213,714 B1 | | 4/2001 | Rhodes |
| 6,234,754 B1 | * | 5/2001 | Zelesky et al. ........... 416/97 R |
| 6,241,466 B1 | * | 6/2001 | Tung et al. ................. 415/115 |

* cited by examiner

Primary Examiner—Christopher Verdier
(74) Attorney, Agent, or Firm—Pierce Atwood; David Narciso

(57) ABSTRACT

There is provided a turbine airfoil having a plurality of pressure side bleed slots through which cooling air is discharged. A portion of the slot openings are covered with an outer wall which comprises a high temperature foil.

14 Claims, 2 Drawing Sheets

FOIL FORMED STRUCTURE FOR TURBINE AIRFOIL TRAILING EDGE

BACKGROUND OF THE INVENTION

This invention relates generally to gas turbine engines and more particularly to gas turbine engine components formed in part from high temperature foil materials.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

Gas turbine engine hot section components, in particular the high pressure turbine section components, operate at extremely high temperatures and need to be cooled to have acceptable longevity. Cooling is typically provided by extracting relatively cool air from an upstream location of the engine and routing the cooling air to components where it is needed. Conventionally the components to be cooled are hollow and have provisions for receiving and distributing the cooling air by various methods, for example the components may be film cooled by providing a plurality of passages which eject a blanket of cooling air over the surface of the component, or the components may be convectively cooled by causing the cooling air to flow through various internal passages.

Known cooling arrangements often include a plurality of openings in the trailing edge of an airfoil through which cooling air is discharged. These openings may take the form of a pressure side bleed slot arrangement, in which the airfoil pressure side wall stops short of the extreme trailing edge of the airfoil, creating an opening which is divided into individual bleed slots by a plurality of longitudinally extending lands incorporated into the airfoil casting. These slots perform the function of channeling a thin film of cooling air over the surface of the airfoil trailing edge. Airfoils having such a pressure side bleed slot arrangement are known to be particularly useful for incorporating a thin trailing edge. In effect, the trailing edge thickness of the airfoil is equal to that of the suction side thickness alone. This is desirable in terms of aerodynamic efficiency. Ideally, the slot exits are extended toward the trailing edge as far as possible to maintain a good film cooling effectiveness. However, because of casting process limitations on minimum metal thickness, the slots have exits at a finite distance upstream from the trailing edge. This results in an area of uncovered film cooling downstream of the slot exits, which can allow mixing of hot flowpath gasses with the cooling air flow and often results in severe oxidation.

Accordingly, there is a need for gas turbine engine airfoils having improved trailing edge cooling effectiveness.

BRIEF SUMMARY OF THE INVENTION

The above-mentioned need is met by the present invention, which provides a turbine airfoil having a plurality of pressure side bleed slots through which cooling air is discharged. A portion of the slot openings are covered with an outer wall which comprises a high temperature foil.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
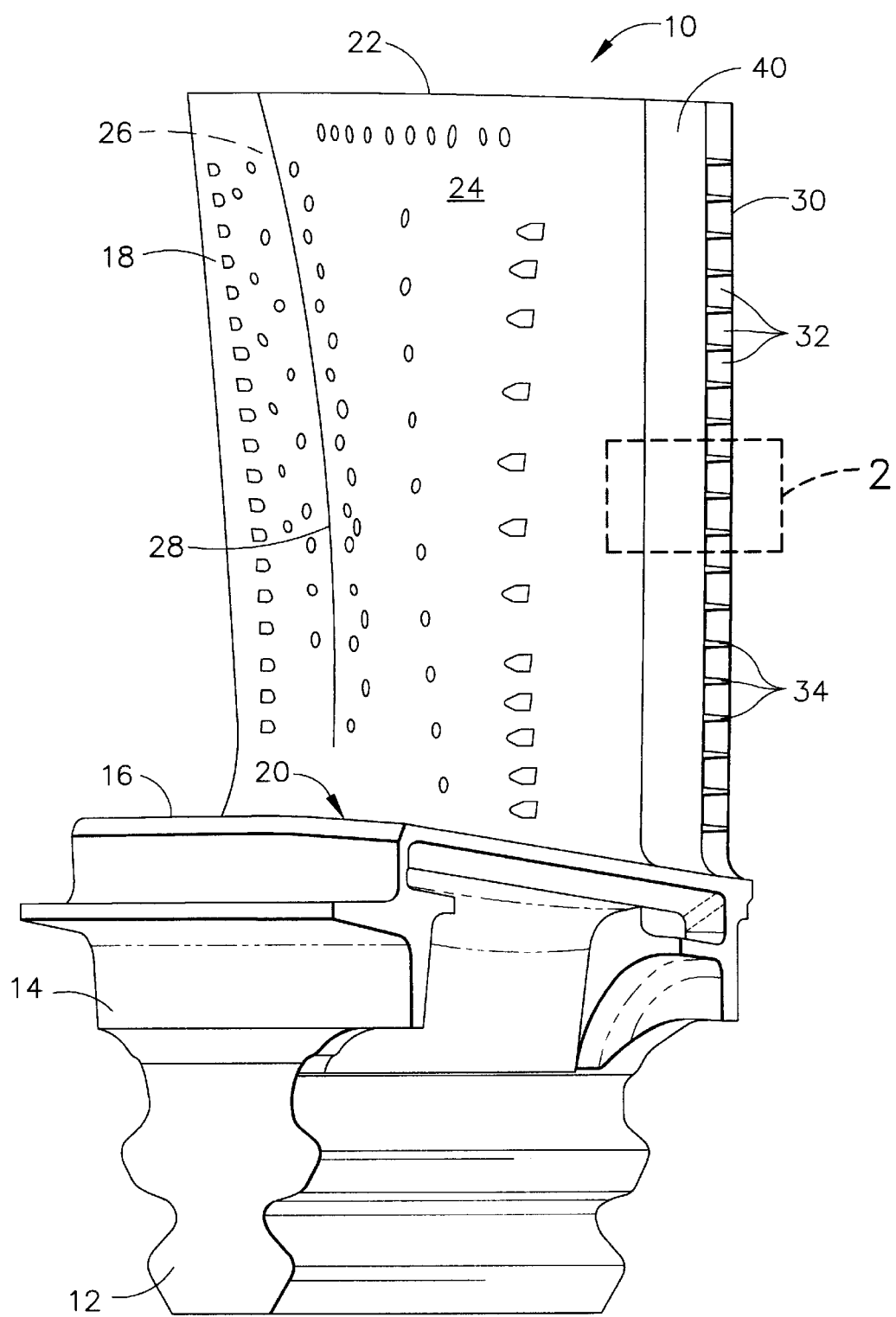
FIG. 1 is a perspective view of a high pressure turbine blade incorporating a foil-formed structure according to the present invention.

By way of example, FIG. 1 depicts the present invention as embodied in a turbine blade 10; however, the invention is equally applicable to other types of airfoils. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil 18 has a root 20 at the junction of the platform 16 and the airfoil 18, and a tip 22 at its radially outer end. The airfoil 18 has a concave pressure side wall 24 and a convex suction side wall 26 joined together at a leading-edge 28 and at a trailing edge 30. The airfoil 18 may take any configuration suitable for extracting energy from the hot gas stream and causing rotation of the rotor disk. The turbine blade 10 is preferably formed as a one-piece casting of a suitable superalloy, such as a nickel-based superalloy, which has acceptable strength at the elevated temperatures of operation in a gas turbine engine. The airfoil 18 incorporates a plurality of trailing edge bleed slots 32 on the pressure side wall 24 of the airfoil 18, separated by lands 34.

Figure 2:
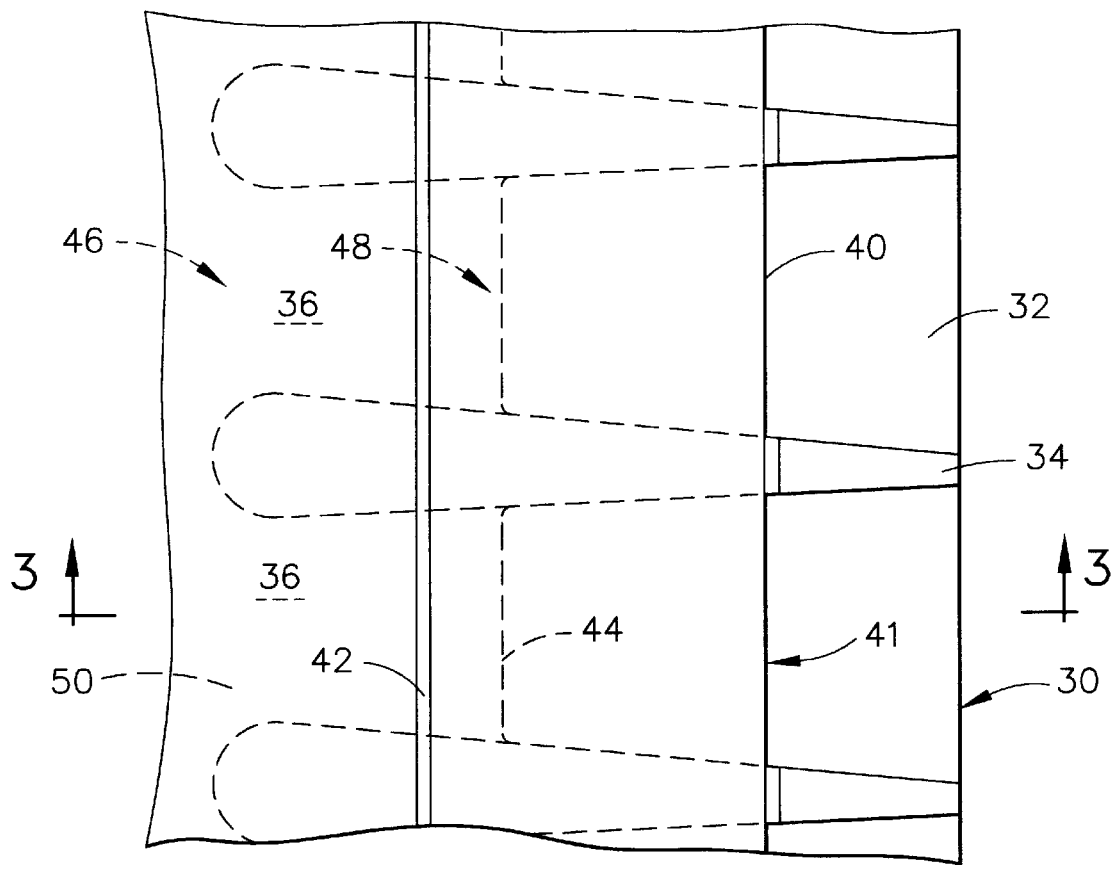
FIG. 2 is an enlarged fragmentary view of a region of the blade enclosed by dashed box 2 of FIG. 1.
Figure 3:
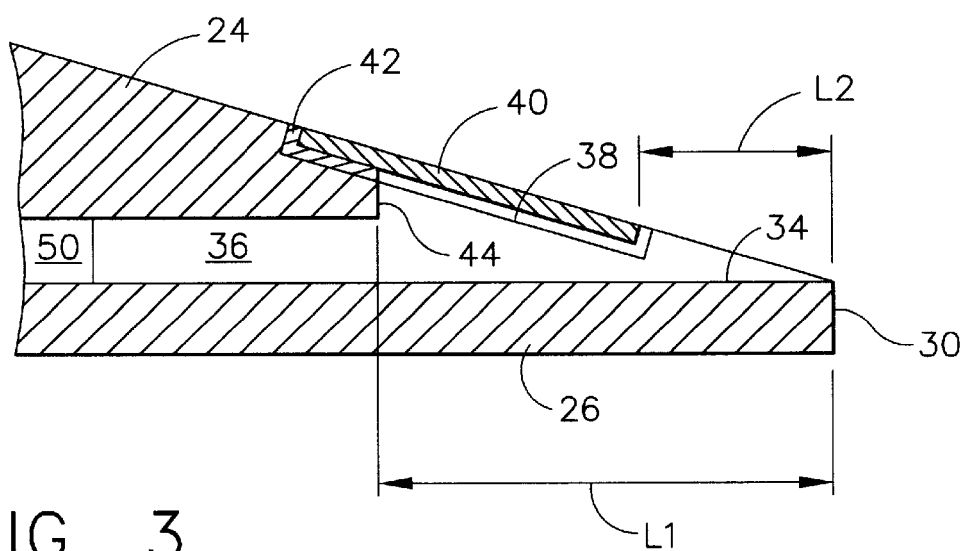
FIG. 3 is a view taken along lines 3—3 of FIG. 2.

Referring now to FIGS. 2 and 3, the pressure side wall 24 and suction side wall 26 are separated by an internal cavity 50. The side walls taper inwards toward the trailing edge 30. The suction side wall 26 continues unbroken the entire chordwise length of the airfoil 18 all the way to the trailing edge 30, whereas the pressure side wall 24 has an aft-facing lip 44 so as to expose an opening near the trailing edge 30, which is divided by the lands 34 into the plurality of trailing edge slots 32. The lands 34 also extend forward so as to divide a portion of the internal cavity 50 into a plurality of trailing edge cooling passages 36, each of which has an inlet 46 near the forward end of the lands 34, and an exit 48 at the aft-facing lip 44. The aft-facing lip 44 defines the axial position where the trailing edge cooling passages 36 end and the trailing edge slots 32 begin. As used herein, the term "axial" refers to the direction defined by the longitudinal axis of the gas turbine engine (not shown). In this type of airfoil 18, the trailing edge thickness at the aft end of the airfoil 18 is essentially equal to the thickness of the suction side wall 26 alone. The lands 34 are tapered so that they decrease in thickness as they extend axially rearward. This diffuses the cooling air flow to improve the cooling film coverage. The taper of the lands 34 continues as the lands 34 extend forward of the aft facing lip 44 underneath the pressure side wall 24, so that the cooling passages 36 are tapered, having their maximum area at their exits 48, and also diffuse the cooling air flow.

The cooling effectiveness of the trailing edge slots 32 is related to their axial length, called the slot breakout distance. In a conventional cast configuration, the slot breakout distance is equal to the distance from the aft facing lip 44 to the trailing edge 30 (denoted L1 in FIG. 3). The longer the slot breakout distance, the lower the trailing edge cooling effectiveness, because the hot flowpath gases passing over the airfoil 18 upstream of the extreme trailing edge tend to mix with the cooling air discharged from the trailing edge cooling passages 36. Effective cooling of the trailing edge 30 is especially important in high pressure turbine airfoil applications for life, durability, and reparability.

The distance L1 is controlled by the overall airfoil thickness at the axial location of the aft-facing lip 44. This thickness is the sum of the pressure-side wall thickness, the suction-side wall thickness, and the cross-sectional width of the cooling passages 36. Reduction of any of those dimensions would allow the distance L1 to be reduced by shifting the aft facing lip 44 rearward, while maintaining the same overall airfoil thickness. However, each of these dimensions has its own minimum value. In the case of the cooling passage 36, there is a minimum width required in order to avoid excessive breakage of the ceramic cores used to produce the cooling passages 36 during the casting process of the airfoil 18 and to provide the required cooling airflow. In the case of the pressure and suction side walls, each has a minimum thickness, which is determined taking into consideration the expected operating environment, including thermal, aerodynamic, and mechanical loads, and production process capability, including the possibility of "core shift" which is an effect caused by the movement of the ceramic cores used to define the interior dimensions of the airfoil 18 during the casting process. A typical cast airfoil wall has a minimum thickness of about 0.762 mm (0.030 in.).

The present invention avoids these difficulties by incorporating a relatively thin outer wall 40. A notch 38 is formed in a portion of the pressure side wall 24 and the lands 34. The outer wall 40 is disposed in the notch 38 and attached to the lands 34 and the pressure side wall 24. In the illustrated example the outer wall 40 has a thickness of about 0.127 mm (0.005 in.) to about 0.254 mm (0.01 in.). The use of the relatively thin outer wall 40 enables the slot breakout distance to be effectively decreased as shown in FIGS. 2 and 3 to the distance denoted L2, which is the distance between the aft edge 41 of the outer wall 40 and the trailing edge 30.

The outer wall 40 is constructed from a high temperature foil. By the use of the term "high temperature foil" it is meant a structure which is made from an alloy having improved strength and oxidation resistance over conventional superalloys at temperatures above 1093° C. (2000° F.), and capable of being formed to a thickness of about 0.51 mm (0.020 in.) or less. High temperature foils have an advantage over other similarly thin structures used in gas turbine applications in that they do not require large amounts of cooling air to achieve acceptable longevity. Suitable compositions of high temperature foils are described below. Depending on the type of high temperature foil used, an interface layer 42 may be disposed between the lands 34 and the outer wall 40.

One suitable material that a high temperature foil may be formed from is a rhodium-based alloy comprising from about three atomic percent to about nine atomic percent of at least one precipitation-strengthening metal selected from the group consisting of zirconium, niobium, tantalum, titanium, hafnium, and mixtures thereof; up to about four atomic percent of at least one solution-strengthening metal selected from the group consisting of molybdenum, tungsten, rhenium, and mixtures thereof; from about one atomic percent to about five atomic percent ruthenium; up to about ten atomic percent platinum; up to about ten atomic percent palladium; and the balance rhodium; the alloy further comprising a face-centered-cubic phase and an $L1_2$ structured phase.

Another suitable material for the high temperature foil is a second rhodium-based alloy comprising rhodium, platinum, and palladium, wherein the alloy comprises a microstructure that is essentially free of $L1_2$-structured phase at a temperature greater than about 1000° C. (1832° F.). More particularly, the Pd is present in an amount ranging from about 1 atomic percent to about 41 atomic percent; the Pt is present in an amount that is dependent upon the amount of palladium, such that: a) for the amount of palladium ranging from about 1 atomic percent to about 14 atomic percent, the platinum is present up to about an amount defined by the formula (40+X) atomic percent, wherein X is the amount in atomic percent of the palladium; b) for the amount of palladium ranging from about 15 atomic percent up to about 41 atomic percent, the platinum is present in an amount up to about 54 atomic percent; and the balance comprises rhodium, wherein the rhodium is present in an amount of at least 24 atomic percent.

The high-temperature foil compositions described above exhibit about 1.2% thermal expansion from room temperature to about 1204° C. (2200° F.), whereas typical nickel-based superalloys used to form the airfoil 18 exhibit about 1.8% thermal expansion over the same temperature range. If the outer wall 40 were directly attached to the lands 34, the difference in thermal expansion between the Rh-based alloy and the superalloy would be large enough to cause concern due to stresses at the inter-mixed zone caused by differential thermal expansion. Therefore, it is desirable to incorporate an interface layer 42 between the outer wall 40 and the lands 34. The interface layer 42 has a thermal expansion intermediate to that of the high temperature foil and the superalloy, for example about 1.6% over the same temperature range.

In one possible embodiment, the interface layer 42 has a composition comprising from about 51 to about 61 atomic parts chromium, from about 18 to about 26 atomic parts palladium, and from about 18 to about 26 atomic parts nickel (but the nickel and palladium need not be present in equal amounts), and optionally has an addition of from about 5 to about 8 atomic parts aluminum. Minor amounts of other elements such as impurities may be present as well. The total of all of the elements is 100 atomic percent. Nickel forms the balance of the interface layer 42. Preferably, the interface layer 42 comprises about 56 atomic parts chromium, about 22 atomic parts nickel, and about 22 atomic parts palladium.

The interface layer 42 may be applied as a solid piece and bonded to the surface of the lands 34. The interface layer 42 may instead be supplied as a weld filler material and melted onto the surface of the lands 34. Welding may be accomplished by any operable approach. In either case, during application and/or service an interdiffusion of the adjacent portions of the lands 34 and the interface layer 42 may occur. This interdiffusion is desired, as it tends to raise the melting point of the interface layer 42 and improve the oxidation resistance of the interdiffused combination.

The outer wall 40 is applied overlying the interface layer 42. The outer wall 40 is preferably applied by welding or brazing. In one approach it is applied as a solid piece. The underlying interface layer 42, which has a lower melting point than either the airfoil 18 or the outer wall 40, is melted during the application process and then resolidified to cause bonding of the interface layer 42 to the airfoil 18 and to the outer wall 40. In another approach, the outer wall 40 is attached to the interface layer 42 by welding, for example by electron beam welding or laser welding. Any operable welding technique may be used.

Another suitable alloy for use as a high temperature foil is a solid-solution strengthened nickel-based alloy composition including about 10 to about 15 wt % Co; about 18 to about 22 wt % Cr; about 0.5 to about 1.3 wt % Al; about 3.5 to about 4.5 wt % Ta; about 1 to about 2 wt % Mo; about 13.5 to about 17.0 wt % W; up to about 0.08 wt % C; up to about 0.06 wt % Zr; up to about 0.015 wt % B; about 0.4 to about 1.2 wt % Mn; about 0.1 to about 0.3 wt % Si; and balance Ni. According to a particular composition, C is present in an amount not less than about 0.02 wt %, Zr is present in an amount not less than about 0.01 wt %, B is present in an amount not less than about 0.005 wt %. In a preferable form, the composition includes about 13.5 wt % Co; about 20 wt % Cr; about 0.8 wt % Al; about 4 wt % Ta; about 1.5 wt % Mo; about 15.5 wt % W; about 0.05 wt % C; about 0.03 wt % Zr; up to about 0.01 wt % B; about 0.7 wt % Mn; about 0.2 wt % Si; and balance Ni. The composition may contain typical impurities.

Another suitable nickel-based alloy for the high temperature foil is an alloy composition including about up to about 5.1 wt % Co; about 7.2 to about 9.5 wt % Cr; about 7.4 to about 8.4 wt % Al; about 4.3 to about 5.6 wt % Ta; about 0.1 to about 0.5 wt % Si; about 0.1 to about 0.5 wt % Hf; up to about 0.05 wt % C; up to about 0.05 wt % B; about 0 to about 2.2 Re; about 2.7 to about 4.4 wt % W; and balance Ni. Preferably, the composition contains about 3 to about 4.0 wt % Co; about 7.2 to about 8.5 wt % Cr; about 5.0 to 5.6 Ta; about 0.1 to 0.25 Hf, and about 1.0 to about 2.2 Re.

Yet another suitable nickel-based material for the high temperature foil is an alloy composition including about 2 to about 5 wt % Co; about 5 to about 15 wt % Cr; about 7 to about 10 wt % Al; about 4 to about 6 wt % Ta; about 0.5 to about 1.5 wt % Si; about 0.1 to about 0.5 wt % Hf; up to about 0.05 wt % C; up to about 0.05 wt % B; about 1.0 to about 2.0 Re; about 3 to about 4.5 wt % W; and balance Ni. Preferably, the composition contains about 3 to about 3.5 wt % Co; about 7 to about 9 wt % Al; up to about 0.03 wt % C; and up to about 0.03 wt % B.

An outer wall 40 formed from a nickel-based high temperature foil as described above does not require an interface layer 42, as its thermal expansion is similar to that of the airfoil 18. The outer wall 40 is applied to the lands 34 as a solid piece, preferably by welding, for example by electron beam welding or laser welding. Any operable welding technique may be used.

In operation, cooling air from the internal cavity 50 flows through the trailing edge cooling passages 36 and then out the trailing edge slots 32. The outer wall 40 effectively extends the cooling slots 32 toward the trailing edge 30 without increasing the trailing edge thickness, and protects the cooling air from the mixing with hot flowpath gases. The cooling air leaving the cast-in trailing edge cooling passages 36 will be covered under the outer wall 40 to provide convection cooling or 100% effective film cooling (i.e. film cooling free from mixing of hot flowpath gases with the cooling film). This arrangement reduces the length of the uncovered film cooling surface and can reduce the airfoil trailing edge operating temperature.

The foregoing has described a turbine airfoil having a plurality of pressure side bleed slots through which cooling air is discharged. A portion of the slot openings are covered with an outer wall which comprises a high temperature foil. While specific embodiments of the present invention have been described, it will be apparent to those skilled in the art that various modifications thereto can be made without departing from the spirit and scope of the invention as defined in the appended claims.

What is claimed is:

1. An airfoil having a leading edge and a trailing edge, comprising:
   a pressure side wall extending from said leading edge to said trailing edge;
   a suction side wall spaced apart from said pressure side wall, said suction side wall extending from said leading edge to said trailing edge;
   a slot disposed in said pressure side wall adjacent said trailing edge;
   a land disposed adjacent said slot, said land extending from said pressure side wall to said suction side wall; and
   an outer wall attached to said land, said outer wall covering a portion of said slot, wherein said outer wall comprises a high temperature foil.

2. The airfoil of claim 1 wherein said high temperature foil comprises a rhodium-based alloy.

3. The airfoil of claim 2 further comprising an interface layer disposed between said outer wall and said land.

4. The airfoil of claim 3 wherein said interface layer comprises chromium, palladium, and nickel.

5. The airfoil of claim 4 wherein said pressure side wall and said suction side wall comprise a nickel-based superalloy.

6. The airfoil of claim 1 wherein said high temperature foil comprises a nickel-based alloy.

7. The airfoil of claim 1 further comprising a notch disposed in said land, wherein said outer wall is received in said notch.

8. An airfoil having a leading edge, a trailing edge, a root, and a tip, comprising:
   a pressure side wall extending from said leading edge to said trailing edge;
   a suction side wall extending from said leading edge to said trailing edge;
   an internal cavity between said pressure side wall and said suction side wall;
   a plurality of slots disposed in said pressure side wall adjacent said trailing edge and separated by a plurality of axially extending lands;
   a plurality of trailing edge cooling passages disposed between said internal cavity and said slots, each of said passages having an inlet in fluid communication with said internal cavity and an exit in fluid communication with one of said slots, said passages being bounded by said pressure side wall and said suction side wall, and
   an outer wall attached to said lands, said outer wall covering a portion of said slots, wherein said outer wall comprises a high temperature foil.

9. The airfoil of claim 8 wherein said high temperature foil comprises a rhodium-based alloy.

10. The airfoil of claim 9 further comprising an interface layer disposed between said outer wall and said lands.

11. The airfoil of claim 10 wherein said interface layer comprises chromium, palladium, and nickel.

12. The airfoil of claim 11 wherein said pressure side wall and said suction side wall comprise a nickel-based superalloy.

13. The airfoil of claim 8 wherein said high temperature foil comprises a nickel-based alloy.

14. The airfoil of claim 8 further comprising a notch disposed in each of said plurality of lands, wherein said outer wall is received in said notches.

* * * * *